United States Patent [19]

Evans

[11] Patent Number: 4,623,045
[45] Date of Patent: Nov. 18, 1986

[54] AUTOMATIC BRAKE ADJUSTING MECHANISM

[75] Inventor: Anthony C. Evans, Northville, Mich.

[73] Assignee: Kelsey-Hayes Company, Romulus, Mich.

[21] Appl. No.: 630,569

[22] Filed: Jul. 13, 1984

[51] Int. Cl.$^4$ .............................................. F16D 65/56
[52] U.S. Cl. ......................... 188/79.5 P; 188/196 BA
[58] Field of Search ................. 188/79.5 P, 79.5 GT, 188/79.5 GC, 79.5 GE, 79.5 R, 79.5 K, 196 BA, 327–330, 196 C, 196 R, 196 B, 196 V, 200; 192/111 A

[56] References Cited

U.S. PATENT DOCUMENTS

| | | | |
|---|---|---|---|
| 4,101,011 | 7/1978 | Burnett | 188/79.5 GT |
| 4,146,117 | 3/1979 | Kawaguchi et al. | 188/196 BA X |
| 4,196,795 | 4/1980 | Izumi | 188/79.5 P |
| 4,276,966 | 7/1981 | Ayers | 188/79.5 P |
| 4,344,512 | 8/1982 | Woo | 188/79.5 GE |
| 4,401,195 | 8/1983 | Last | 188/79.5 P |

Primary Examiner—Douglas C. Butler
Attorney, Agent, or Firm—Ralph J. Skinkiss; Robert H. Johnson

[57] ABSTRACT

An internal shoe drum brake having a pair of hydraulically actuated brake shoes and an automatic brake adjusting mechanism. The brake adjusting mechanism includes a variable length strut disposed between the two brake shoes and actuated to increase in length by use of of a notched wheel which is rotated through engagement with a lever pivotally connected to one of the brake shoes and biased to rotate the wheel by use of a compression spring. The action of the one lever is controlled by a second lever also pivotally connected to the brake shoe and engageable by the strut and the one lever so that pivotal movement of the second lever permits a pivotal movement of the one lever of approximately three times the movement of the second lever away from the strut as great of the first lever.

12 Claims, 4 Drawing Figures

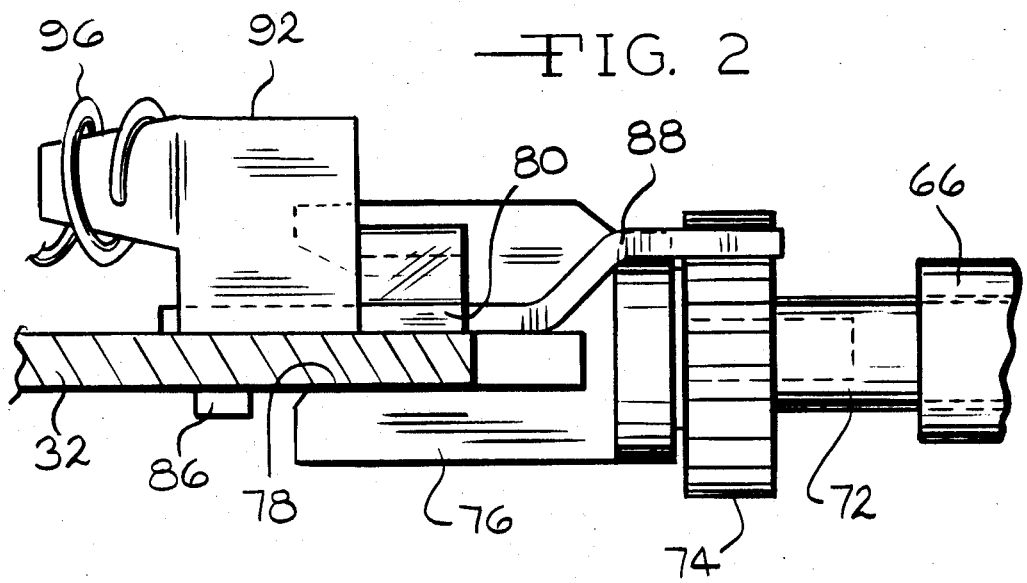
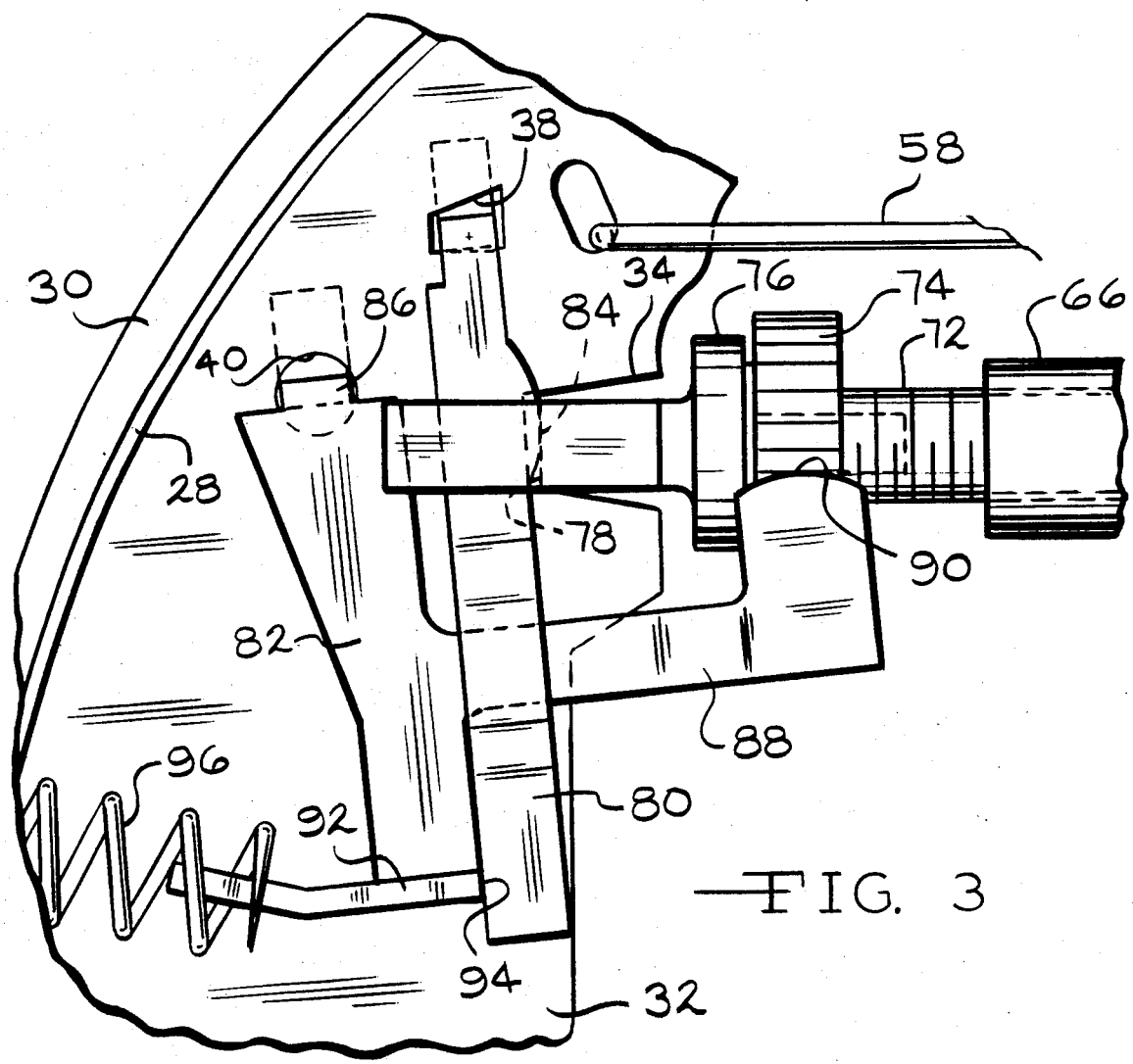

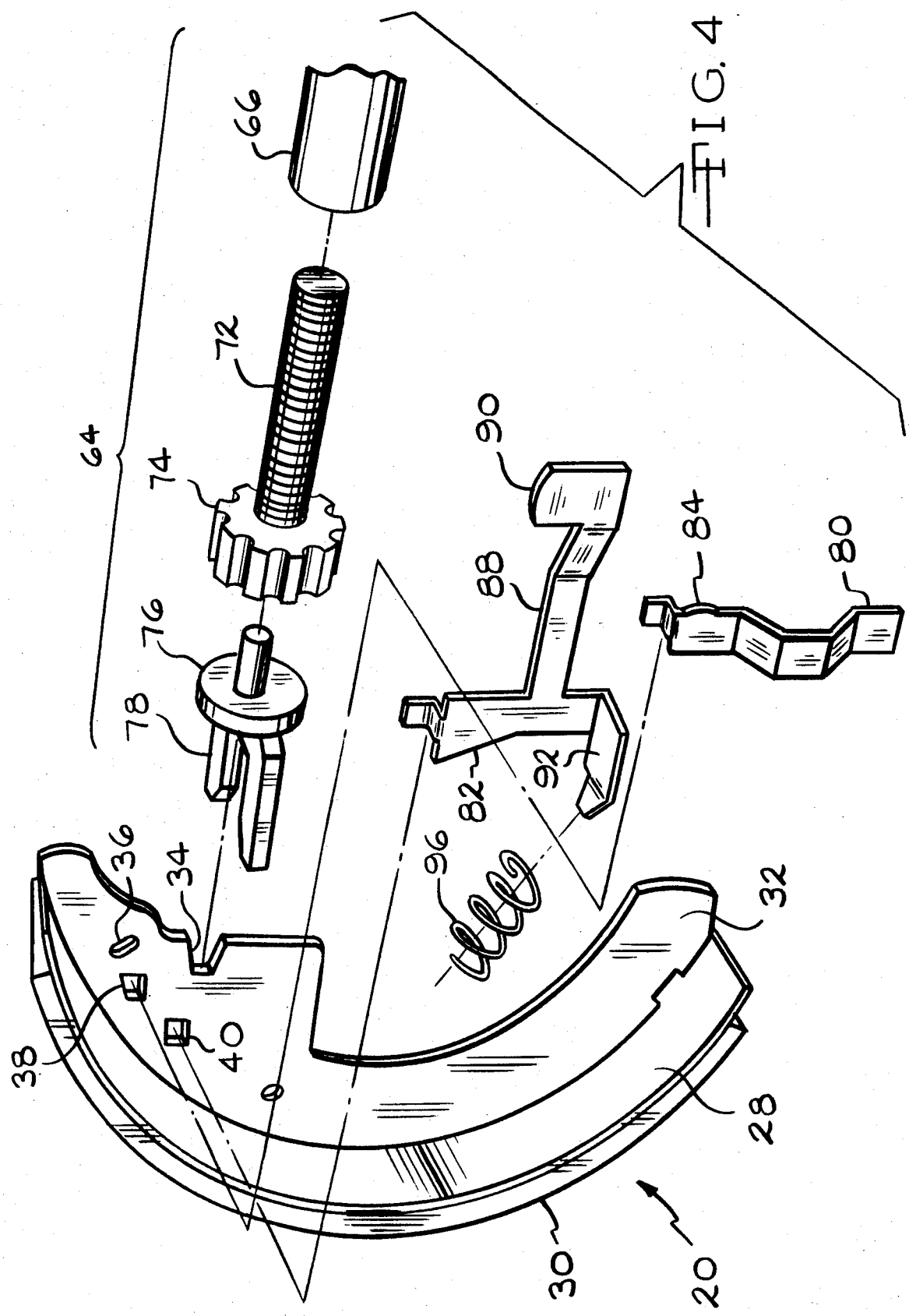

AUTOMATIC BRAKE ADJUSTING MECHANISM

BACKGROUND OF THE INVENTION

This invention relates to internal shoe drum brakes, and more specifically to mechanism for automatically adjusting the clearance of the brake shoes from the brake drum to compensate for brake shoe wear.

The use of automatic brake adjusters in conjunction with drum brakes is well-known, as is exemplified by U.S. Pat. Nos. 4,276,966 and 4,401,195. In the interest of saving weight in automotive vehicles in order to gain improved fuel economy, wheels and brakes have been made smaller. That is, their diameter has been reduced. As a result, brakes with a 7.08 inch (180 mm) diameter drum are being used in some vehicles. Such a small diameter drum leaves insufficient room between the brake wheel cylinder and the wheel bearing hub for the type of automatic brake adjusters used previously.

I have invented a brake adjuster which fits in the available space in brakes with 7.08 inch (180 mm) diameter drums and still provides enough linkage movement so that the brake shoe clearance can be adjusted back to the minimum clearance when the brake shoe clearance reaches the maximum design clearance.

BRIEF SUMMARY OF THE INVENTION

This invention relates to an automatic brake adjuster intended for use with a drum brake. The drum brake includes a pair of brake shoes, each shoe having a web, a wheel cylinder for moving the shoes into engagement with the brake drum, and a release spring connected between the shoes and biasing them away from the drum.

The adjuster includes a variable length strut disposed between and engaging the webs of the two brake shoes, a first lever pivotally connected to the web of one brake shoe and engaged by the strut, a second lever pivotally connected to the web of the one brake shoe and engaging the strut, the two levers engaging each other, and means carried by one of the levers and engaging the one brake shoe for biasing the second lever into engagement with the strut.

It is a principal object of my invention to provide an improved automatic brake adjuster which can be used with a small diameter drum brake.

The above and other objects, features and advantages of my invention will become apparent upon consideration of the detailed description and appended drawing.

BRIEF DESCRIPTION OF THE DRAWING

FIG. 2 is an enlarged fragmentary view taken along line 2—2 in FIG. 1 showing to advantage my improved brake adjuster, FIG. 3 is an enlarged fragmentary view of my improved brake adjuster, and FIG. 4 is an exploded view of my improved brake adjuster.

DETAILED DESCRIPTION OF THE PREFERRED EMBODIMENT

Figure 1:
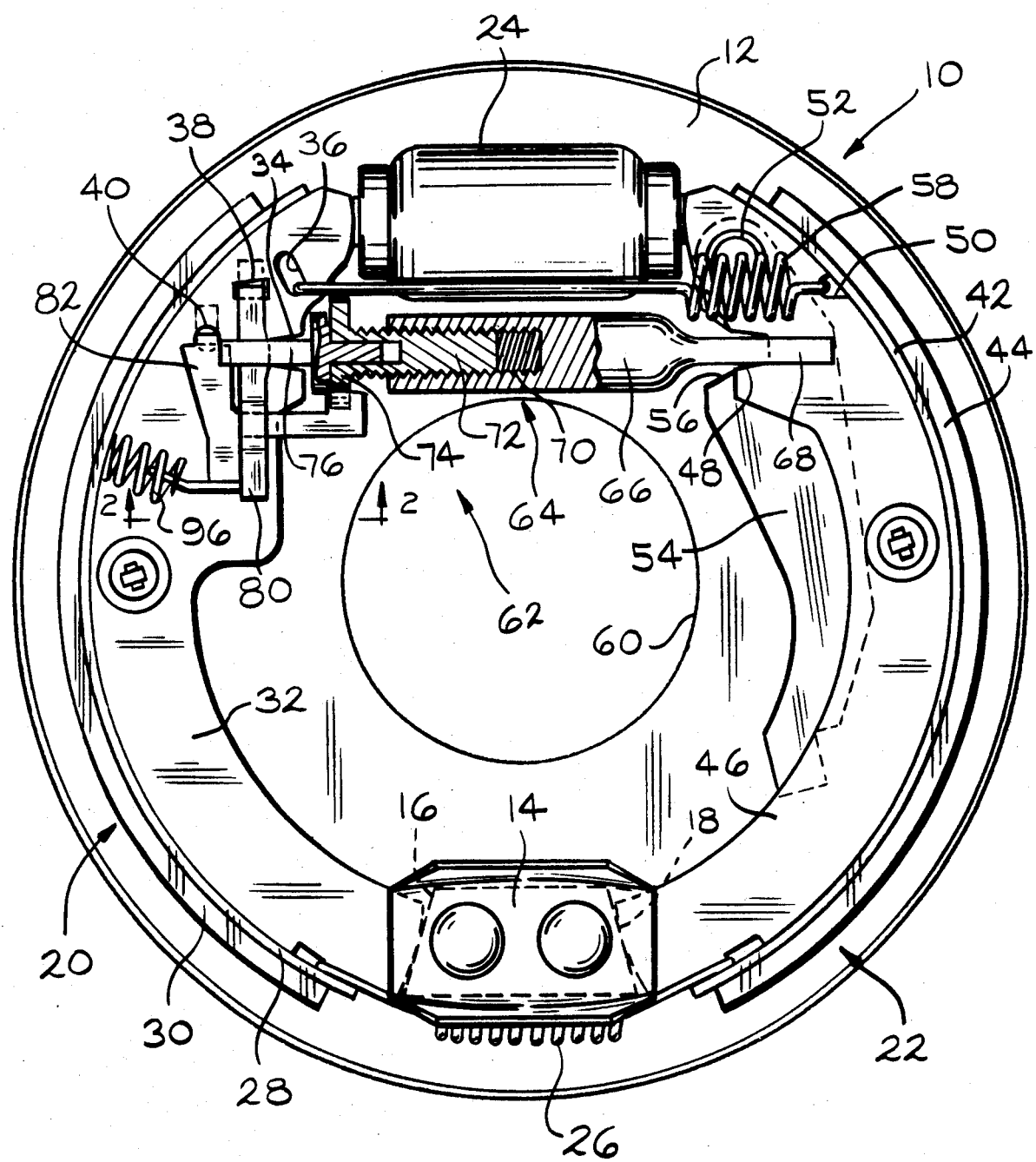
FIG. 1 is a view of a drum brake embodying my improved automatic brake adjuster.

Referring to FIG. 1, the reference numeral 10 denotes an internal shoe drum brake including an annular support plate 12 with an anchor 14 having radially oriented abutment surfaces 16 and 18. Arcuate brake shoes 20 and 22 are arranged back to back with a double piston hydraulic actuator or wheel cylinder 24 disposed between the head end of shoes 20 and 22 and fastened to support plate 12. The heel ends of brake shoes 20 and 22 engage abutment surfaces 16 and 18, respectively, and are biased against abutment surfaces 16 and 18 by a tension spring 26 which engages shoes 20 and 22, as shown, and passes over anchor 14.

Brake shoe 20 includes an arcuate metal plate 28 to which friction material 30 is attached. Extending radially inwardly from plate 28 is web 32 which includes a notch 34 and opening 36, 38 and 40. Similarily, brake shoe 22 includes an arcuate plate 42 to which friction material 44 is attached. Extending radially inwardly from plate 42 is a web 46 which includes a notch 48 and an opening 50. Also, pivotally connected to web 46 at 52 is a lever 54 which includes a notch 56.

Brake shoes 20 and 22 are biased to their retracted position shown in FIG. 1 by a tension spring 58 which engages openings 36 and 50 of brake shoes 20 and 22, respectively.

It is desirable to keep the movement or travel of the brake pedal associated with brake 10 generally constant and not excessive. Since during use of brake 10 friction material 30 and 44 is abraded from shoes 20 and 22 so that the running clearance between these shoes and the associated brake drum tends to increase, it is necessary to provide some means to adjust brake 10 so that the running clearance between the friction material on shoes 20 and 22 and the brake drum is maintained relatively constant. This can be accomplished by an automatic brake adjuster as mentioned previously. Since this specific brake 10 has a relatively small diameter, there is not sufficient space available between actuator 24 and opening 60 through which a bearing hub projects to locate brake adjusters of the designs of which I have been previously aware.

Referring now also to FIGS. 2, 3 and 4, brake 10 is provided with an automatic brake adjusting mechanism 62 which includes an variable length strut 64 disposed between brake shoes 20 and 22 and engaging notches 34 and 48 of webs 32 and 46, respectively. As will become clear, strut 64 serves to determine the retracted position of brake shoes 20 and 22. Strut 64 includes a body 66 having a bifurcated portion 68 which engages notches 48 and 56, as shown, and an internally threaded portion 70. Partially disposed within threaded portion 70 is a threaded rod 72 which has integral with the outer end of it a notched wheel 74. Projecting from and pivotally connected to rod 74 is a bifurcated member 76 which includes a notch 78 that engages notch 34 of web 32. The thread on rod 72 is right handed so that counter clock wise rotation of rod 72, as viewed from the left in all of the figures, will cause an effective lengthening of strut 64.

Adjusting mechanism 62 also includes a pair of interactive levers 80 and 82 which function to rotate notched wheel 74 under certain conditions of brake operation to cause strut 64 to effectively lengthen. Lever 8 has one end thereof inserted through opening 38 so as to pivotally connect lever 80 to web 32. Also, lever 80 is disposed to pass through notch 78 and contact the bottom of notch 78 at 84. Lever 82 includes a tang 86 which passes though opening 40 in order to pivotally connect lever 82 to web 32. Lever 82 includes an extension 88 which is engageable with one of the notches on wheel 74 at 90. Lever 82 also is provided with a projection 92 which serves to engage lever 80 at 94. Projection 92 serves a dual purpose in that it also carries a compression spring 96 which engages plate 28 of brake shoe 20 with the result that lever 82 is biased in a counter-clockwise direction, as viewed in FIGS. 1 and 3.

Strut 64 serves to determine the disengaged position of brake shoes 20 and 22. That is, in a brake which has a new set of brake shoes, strut 64 is set at such a length that in the disengaged position of the brake there is approximately 0.010 inches (0.254 mm) clearance between the outer surface of friction material 30 and 42 and the surrounding brake drum. As the brake is used, the outer layer of friction material is abraded and therefore the running clearance between brake shoes 20 and 22 and the surrounding drum increases in the disengaged condition of the brake. The increase in this running clearance to about 0.020 inches is (0.508 mm) acceptable; however, any greater clearance is undesirable, and so the geometry of adjusting mechanism 62 is arranged so that when the running clearance between the brake shoes and the surrounding drum in the disengaged condition of the brake approaches 0.020 inches (0.508 mm) the adjusting mechanism is actuated to increase the length of strut 64 sufficiently to return the running clearance between brake shoes 20 and 22 and the surrounding drum back to approximately 0.010 inches (0.254), as will be explained in more detail below.

Normal operation of brake 10 is provided by supplying pressurized fluid to hydraulic brake actuator 24 thereby causing the head ends of shoes 20 and 22 to move outwardly against the action of release spring 58 until the shoes engage the drum. During this shoe movement, strut 64 is pushed toward trailing shoe 22 by lever 80 under the bias of spring 96 acting through lever 82. During this action, the bottom of notch 34 in leading shoe 20 moves away from the bottom of notch 78 and strut 64 by an amount equal to the combined clearance of both shoes with the brake drum, as shown in FIG. 3. Also during this action, lever 82 moves in a counter-clock-wise direction about opening 40, as viewed in FIGS. 1 and 3. If extension 88 of lever 82 engages at 90 one of the notches on wheel 74, the wheel will be rotated in a counterclock-wise direction, as viewed from the left in FIGS. 1 and 3, for a distance which corresponds to approximately three times the distance of the movement of the bottom of notch 34 away from the bottom of notch 78 and strut 64. This multiplication of three is due to the geometry of levers 80 and 82. That is, contact point 94 between levers 80 and 82 is approximately three times as far from the pivot point of lever 80 with web 32 as the point of contact 84 between lever 80 and strut 64, the contact point 94 and 90 being approximately equidistance from the pivotal connection between lever 82 and web 32.

The movement of levers 80 and 82 and the dimensions of the notches on wheel 74 are selected so that when the running clearance between the shoes and the surrounding drum has increased from 0.010 inches (0.254 mm) to 0.020 inches (0.508 mm) when the brake is disengaged the end of extension 88 of lever 82 will engage one of the notches on wheel 74 at 90 so that upon the next brake engagement counterclock-wise movement of lever 82 will cause a counterclock-wise rotation of wheel 74 which will result in a lengthening of strut 64 such that the running clearance between the brake shoes and the surrounding brake drum is reduced from approximately 0.020 inches (0.508 mm) back to approximately 0.010 inches (0.254 mm).

The change in length of strut 64 depends, of course, upon the pitch of the thread on rod 72 as well as the effective diameter of wheel 74 and the distance through which wheel 74 is rotated by action of lever 82. In order to provide for a sufficient rotation of rod 72 for a given thread pitch, it is necessary to amplify the relative movement between shoe 20 and strut 64 since the total movement is going to amount to only about 0.040 inches (1.016 mm). In previous designs of adjusting mechanisms this amplification of movement was relatively easy to achieve by using a large diameter wheel on the strut, the wheel being disposed approximately mid-way between the two brake shoes, thereby providing relatively a long lever arm as well as a large diameter wheel.

As was pointed out previously, it is not possible to achieve this kind of construction in the smaller diameter brakes, such as brake 10, since there is insufficient space between hydraulic actuator 24 and opening 60 through which the bearing hub extends to provide room for the required adjusting mechanism. Consequently, my improved brake adjusting mechanism 62 utilizes a relatively small diameter wheel 74 located closely adjacent web 32 of brake shoe 20. Also, levers 80 and 82 are disposed in an overlying relationship to each other and to web 32 of brake shoe 20, as viewed in FIGS. 1 and 3, with only extension 88 of lever 82 extending past the perimeter of web 32, levers 80 and 82 otherwise being disposed entirely within the perimeter of web 32 along with compression spring 96.

It will now be apparent that my improved construction has provided a compact adjusting mechanism which readily fits within the space availabe in small diameter brakes.

While only a single embodiment of my invention has been shown, it is subject to various changes and modifications without departing from the spirit and scope of the invention. Therefore, the limits of my invention should be determined from the claims when construed in light of the prior art.

I claim:

1. In a drum brake having a pair of brake shoes, an automatic brake adjusting mechanism comprising:
    a variable length strut disposed between and engaging the brake shoes,
    a first lever having a first pivotal connection to one of the brake shoes and engaged by said strut,
    a second lever having a second pivotal connection to the one brake shoe and engaging said strut,
    said levers being engageable with each other, and
    means connected to one of said levers for biasing said second lever into engagement with said strut.

2. A mechanism as set forth in claim 1 wherein said strut includes a rotatable notched wheel engageable by said second lever and which causes said strut to lengthen when said wheel is rotated in one direction.

3. A mechanism as set forth in claim 2 wherein said wheel is located closely adjacent to the one brake shoe and said levers are located in overlaying relationship to the one brake shoe and substantially within the perimeter of the one brake shoe.

4. A mechanism as set forth in claim 3 wherein said biasing means is a spring disposed between the one brake shoe and said one lever.

5. A mechanism as set forth in claim 4 wherein said one lever includes a projection which engages the other of said levers and said spring is a compression spring carried by said projection.

6. In a drum brake having a pair of brake shoes with webs, an automatic brake adjusting mechanism comprising:
- a variable length strut disposed between the brake shoes and engaging the web of each brake shoe,
- a first lever having a first pivotal connection to the web of one of the brake shoes and engaged by said strut,
- a second lever having a second pivotal connection to the web of the one brake shoe and engaging said strut,
- said levers being engageable with each other, and
- means connected to one of the levers for biasing said second lever into engagement with said strut.

7. A mechanism as set forth in claim 6 wherein said strut includes a rotatable notched wheel engageable by said second lever and which causes said strut to lengthen when said wheel is rotated in one direction.

8. A mechanism as set forth in claim 7 wherein said wheel is located closely adjacent to the web of the one brake shoe and said levers are located in overlaying relationship to the web of the one brake shoe and substantially within the perimeter of the web of the one brake shoe.

9. A mechanism as set forth in claim 8 wherein said biasing means in a spring disposed between the one brake shoe and said one lever.

10. A mechanism as set forth in claim 9 wherein said one lever includes a projection which engages the other of said levers and said spring is a compression spring carried by said projection.

11. In a drum brake having a pair of brake shoes with webs, an automatic brake adjusting mechanism comprising:
- a variable length strut disposed between the brake shoes and engaging the web so each of the brake shoes, said strut including a notch which engages the web of one of the brake shoes and a rotatable notched wheel located closely adjacent the web of the one brake shoe and which causes said strut to lengthen when said wheel is rotated in one direction,
- a first lever having a first pivotal connection to the web of the one brake shoe, said first lever being disposed in said notch and engaged by said strut,
- a second lever having a second pivotal connection to the web of the one brake shoe and engageable with said notched wheel, said second lever including a projection which engages said first lever so that movement of said first lever is dependent upon movement of said second lever,
- said levers being disposed substantially within the perimeter of the web of the one brake shoe, and
- a compression spring carried by said projection and in engagement with the one brake shoe to bias said second lever into engagement with said notched wheel.

12. In a drum brake having a pair of brake shoes an automatic brake shoe adjusting mechanism comprising:
- (a) a variable length strut means disposed between said brake shoes, said strut means including screw means whereby rotation of said screw means affects an increase in said strut means length,
- (b) a strut adjusting lever pivotally connected to one of said brake shoes and engaging said screw means,
- (c) an elongate strut biasing lever pivotally connected at one end thereof to said brake shoe, and engaging said strut adjusting lever at the opposite end thereof and engaging said variable length strut means at a point between said pivotal connection and the engagement with said strut adjusting lever,
- (d) biasing means urging said strut adjusting lever into engagement with said strut biasing lever and said screw means whereby upon activation of said drum brake said strut adjusting lever is caused to rotate about its pivotal connection thereby affecting similar rotation of said strut biasing lever about its pivotal connection and simultaneously urging said variable length adjusting strut into engagement with the other brake shoe and urging rotation of said screw means.

* * * * *